United States Patent [19]
Derks et al.

[11] 3,823,949
[45] July 16, 1974

[54] SHAFT SEAL
[75] Inventors: Leendert L. J. Derks, De Steeg; Olav E. Koster, Arnhem, both of Netherlands
[73] Assignee: Akzona Incorporated, Asheville, N.C.
[22] Filed: Jan. 21, 1971
[21] Appl. No.: 108,491

[30] Foreign Application Priority Data
Jan. 29, 1970  Netherlands...................... 7001239

[52] U.S. Cl................... 277/22, 277/134, 277/135, 277/67
[51] Int. Cl......................... F16j 15/40, F16j 15/00
[58] Field of Search....... 277/16, 22, 133, 135, 134, 277/67, 1

[56] References Cited
UNITED STATES PATENTS
| | | | |
|---|---|---|---|
| 2,369,883 | 2/1945 | Coopey | 277/135 X |
| 2,646,065 | 7/1953 | Tyson | 277/1 X |
| 2,799,522 | 7/1957 | King et al. | 277/16 |
| 2,920,347 | 1/1960 | Joukainen et al. | 277/22 X |
| 3,072,957 | 1/1963 | Blackburn | 277/1 X |
| 3,468,548 | 9/1969 | Webb | 277/134 |

Primary Examiner—Samuel B. Rothberg
Attorney, Agent, or Firm—Francis W. Young; Tom R. Vestal

[57] ABSTRACT

A means for sealing liquids under pressure is disclosed whereby the liquid itself is used as a sealant by cooling the liquid below its solidification point.

3 Claims, 6 Drawing Figures

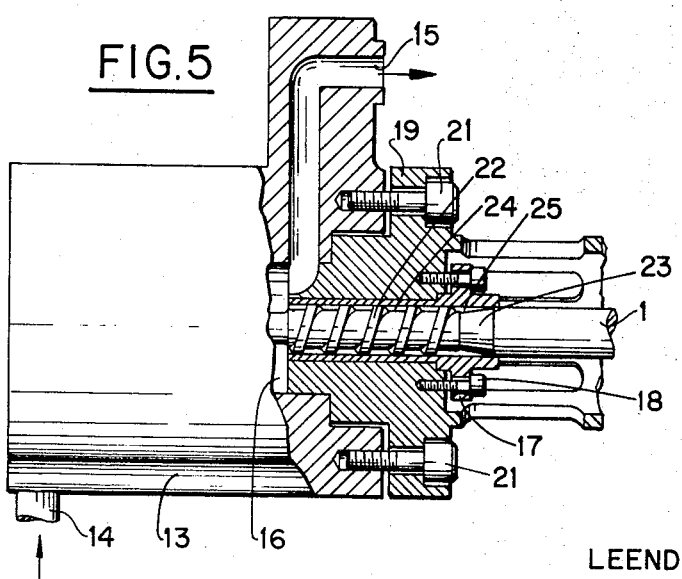

SHAFT SEAL

Various means are known for effecting a seal around a movable shaft in a housing containing liquids under pressure. It is known, for instance, to use a stuffing or gland box filled with packing material such as hemp, cotton, leather, asbestos, soft metal, and the like. It is also known to seal such shafts by means of hydrodynamic sealing.

In the case of stuffing box sealing, however, it is difficult to ensure satisfactory sealing around the shaft if the pressure differential prevailing across the seal is excessive. Moreover, there is a risk of degradation of the seal for various reasons.

In hydrodynamic sealing, a threaded shaft, or threaded bore through which the liquid tends to escape is used in connection with the relative movement of the shaft and bore to retain the liquid within the compartment. The hydrodynamic effect is lost in this sealing method, however, at times of low or no relative movement between shaft and bore.

An object of the present invention is the elimination of the above typical objections of the prior art by providing a seal using the liquid medium being retained as the sealant.

Another object of the invention is to provide a seal capable of retaining liquids under high pressure.

The present invention utilizes a converging bore surrounding a shaft that extends into a housing for retaining fluids. Means are provided to cool the liquid within the bore below the solidification point. The bore converges away from the zone of higher pressure so that the now solidified fluid product forms a plug, or seal, retaining the fluid within the housing. A seal is thereby effected regardless of whether the shaft is in movement or not.

The construction of the bore around the shaft may take various forms in keeping with the above concept. The bore may be incorporated directly into the housing or it may be formed within a bushing that is fit into the housing.

One very effective embodiment combines the aforementioned hydrodynamic sealing with the convergent bore. The bore of this embodiment would allow for hydrodynamic means adjacent the liquid within the housing to act in combination with the convergent plug to retain the liquid while the shaft was in motion. Upon cessation of the movement of the shaft, the convergent plug above would retain the liquid.

Numerous means may be used for cooling the liquid to below its solidification point. In the simplest case where the medium temperature outside the container housing is lower than the solidification point of the liquid, the sealing may be so arranged that the heat exchange between the liquid in the converging bore and the outside medium is sufficient to cause the fluid to solidify.

The application of a cooling medium will generally be necessary, however. Then the liquid can be cooled through conduction from a cooling medium circulating through a duct system surrounding the bore.

The accompanying drawings will illustrate various embodiments of the invention and some means in which it may be used:

FIGS. 1 to 4 show different ways in which the bore according to the invention may be made;

FIG. 5 shows the sealing system according to the invention in a mixer; and

FIG. 6 shows the sealing system according to the invention in a rotary viscometer.

FIG. 1 illustrates a shaft 1 extending through the wall 2 of a container housing for retaining liquids. Liquid under higher pressure than the outside medium is retained in the container housing and in contact with wall surface 3 while wall surface 4 is exposed to the outside medium. The bore in wall 2 comprises two diameters — a larger diameter 5 and smaller diameter 6 — arranged so that the bore converges outward from the pressurized liquid. When the annular opening or slit 7, formed by shaft 1 and diameters 5 and 6, fills with liquid, it is cooled below the solidification point of the liquid by means not shown to form a plug which counteracts the leakage of the liquid through the bore. Pressure of the liquid forces the plug against surface 8, thereby preventing the plug from being forced out of the bore.

The bore 9 in wall 2 of FIG. 2 is in the form of a conical shape, gradually converging outward from the liquid at side 3. Again, when liquid flows into annular slit 7 formed by bore 9 and shaft 1, it is solidified by means not shown to form a plug, thereby sealing the slit 7.

In FIG. 3, shaft 1 is tapered within straight bore 9 to form slit 7 of the invention.

In FIG. 4, shaft 1 comprises two diameters, 11 and 12, the larger diameter 12 being outward from the liquid at wall 3, to form annular slit 7 of the invention.

The mixer shown in FIG. 5 comprises a housing having feed and discharge channels, 14 and 15, respectively. Material to be mixed is supplied through the feed channel 14 to a mixing chamber 16 housing a stirrer (not shown). The stirrer is driven by shaft 1 that is coupled to a driving means, also not shown. The cylindrical bushing 17 supports shaft 1 and is, itself, secured to cover 19 by means of bolts 18. The cover 19 is fastened in a bore 20 by means of bolts 21.

A screw thread 22 of rectangular cross section is formed on shaft 1 adjacent mixing chamber 16 and is enclosed by the inner section of bushing 17. The shaft 1 also comprises the tapered section 23 which, enclosed by the outer section of bushing 17 forms a seal similar to FIG. 2.

When the shaft is rotating, a hydrodynamic seal may be set up in the inner section of bushing 17 by the interaction of the liquid viscosity, shaft diameter, speed of rotation of the shaft, and the length of the threaded portion of the shaft. However, when the shaft is not rotating, there is no counter-pressure to retain the liquid and it will flow toward the conical section 23. There the liquid is cooled by means (not shown) to below the solidification temperature, forming a sealing plug and preventing leakage.

On smaller shafts, the frictional heat of rotation may be relied upon to at least partially melt the plug formed upon restarting the rotation of shaft 1. It may be necessary to incorporate a heating means on larger shafts to overcome frictional forces between the plug and the shaft, or else, make the slit formed as thin as possible.

FIG. 6 is a detail of a rotary viscometer with a vertically mounted cylindrical rotor 26 positioned in a cylindrical stator 27. A control liquid at a predetermined temperature is maintained in the chamber between stator 27 and the outer jacket 28.

In stator 27, conduits 29 and 30 supply and discharge, respectively, the liquid that is to be subjected to viscosity measurement. The rotor 26 is coupled to shaft 1 through torque tube 33 and is rotated by drive means (not shown).

Shaft 1 rotates in bushing 34, the inner wall having screw threads 35 formed therein. Bushing 34 is housed in cover 36, which is secured to stator 27 through bolts 37. Also housed in cover 36 is a second bushing 39, secured by bolts 38. A converging slit 25 is formed by shaft 1 and the conical inner surface 40 of bushing 39, which changes via a short cylindrical portion 41 into a longer cylindrical portion 42. The latter is connected to a drip tray 43, mounted on bushing 39.

An annular channel 44 circumscribes the conical portion 40 for receiving a cooling medium through connecting pipe 45 and is discharged via a pipe (not shown). A second annular channel 46 circumscribes bushing 34 with screw thread 35. Channel 46 receives a heating medium through conduits 47 and 48.

The conicity of slit 27 is not a critical factor, but it must be designed so that the liquid can be solidified properly. It is recommended that the degree of conicity be approximately 3°.

EXAMPLE 1

The mixer of FIG. 5 is used to homogenize polyethylene terephthalate under a pressure of 100 atmospheres and heated to 275° C. A hydrodynamic seal is formed by the action of the screw thread 22 while the shaft 1 is rotating. When the shaft rotation is stopped, the polymer flows outward into annular slit 25 and is cooled below its solidification temperature, thereby forming a plug sealing the polymer within the mixer. When the shaft is rotated, frictional forces melt the plug in said slit 25.

EXAMPLE 2

A stream of polyethylene terephthalate is supplied to the rotary viscometer of FIG. 6 under a pressure of 200 atmospheres and a temperature of 275° C. The counterpressure built up in the helical slit 24 is sufficient to prevent polymer from leaking out of the viscometer when the shaft is rotating. The risk of the polymer solidifying in slit 24 is eliminated by heating the slit through heating means supplied through annular channel 46.

When the shaft is rotating, the polymer penetrates into conical slit 25 and is cooled below its solidification point by cooling means circulating through annular channel 44. The high frictional forces developed in slit 25 during startup of rotation cause the plug formed in slit 25 to melt, most probably at the interface with shaft 1, so that the shaft may freely rotate again.

What is claimed is:

1. Seal for a movable shaft in a housing for a liquid under pressure, comprising a wall in the housing through which the shaft passes, the wall having a bore for loosely accommodating the shaft and for forming a narrow annular opening therebetween, the wall of the opening formed by the bore and shaft converging away from the liquid; means for forcing liquid into the opening therebetween; and means for cooling said liquid below the solidification point.

2. A seal for a movable shaft extending into a housing for liquid under pressure, said housing having a bore through which the shaft passes, the improvement comprising: a bushing, mountable in said bore and over said shaft, having a first section adjacent the inner surface of said housing and extending at least partway along the shaft with at least one helical groove counter to the direction of rotation of said shaft, and having a second section along said shaft and opposite the helically grooved section from said inner surface, convergent away from said inner surface and toward said shaft, the shaft and said second section forming a conical opening therebetween, and means for cooling said liquid below its solidification point in said conical opening.

3. A seal for a movable shaft extending into a housing for liquid under pressure, said housing having a bore through which the shaft passes, the improvement comprising: a bushing, mountable through said bore and over said shaft, having a first section adjacent the inner surface of said housing and extending at least partway along and parallel to said shaft, and a second section along said shaft and opposite the first section from said inner surface, convergent toward said shaft, the shaft and second section forming a conical opening therebetween, means for cooling said liquid below its solidification point in said conical opening, and wherein at least one helical groove is formed in said shaft counter to the direction of rotation of said shaft and adjacent with said first section.

* * * * *